Oct. 30, 1923.
J. DICKESCHEID
BACKING-OFF LATHE
Filed Aug. 29, 1921
1,472,636
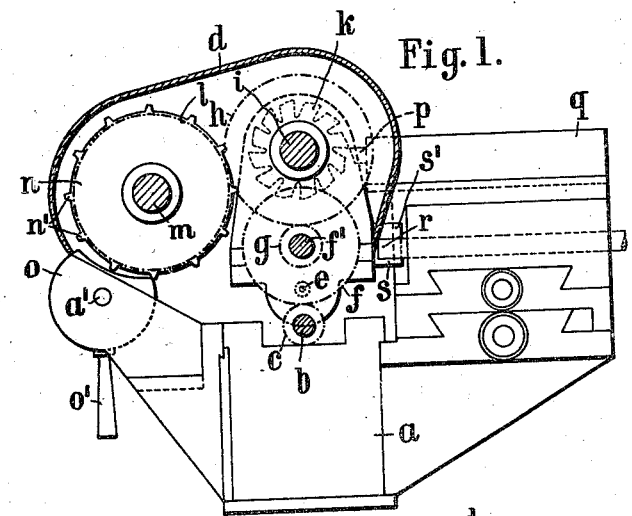
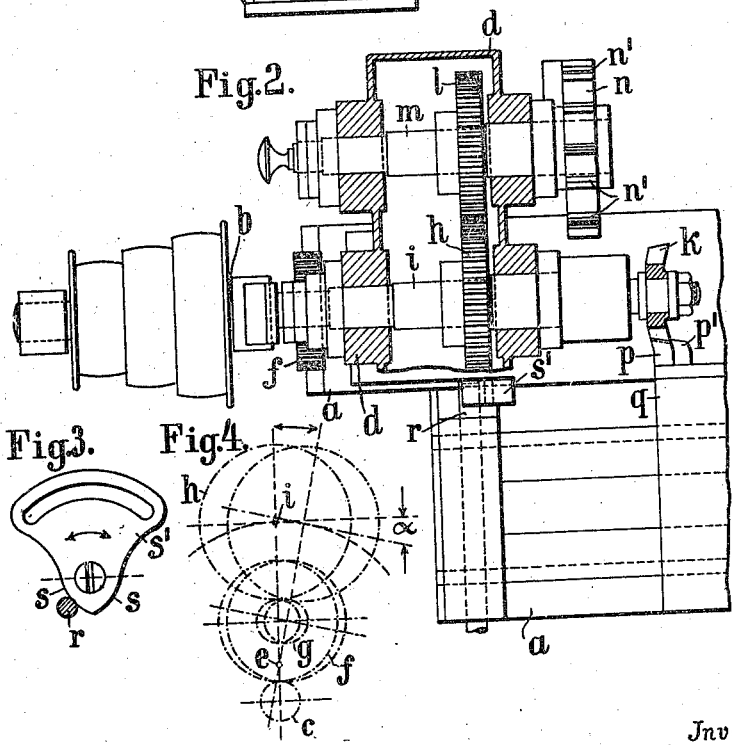
Witnesses:
Emmy Pöritz
Inventor:
Josef Dickescheid
By: Herbert J. R.
Attorney.

Patented Oct. 30, 1923.

1,472,636

UNITED STATES PATENT OFFICE.

JOSEF DICKESCHEID, OF MAINZ, GERMANY, ASSIGNOR TO THE FIRM: DR. H. ZEHRLAUT & CO., OF MAINZ, GERMANY.

BACKING-OFF LATHE.

Application filed August 29, 1921. Serial No. 496,614.

*To all whom it may concern:*

Be it known that I, Josef Dickescheid, a citizen of the German Republic, and a resident of Mainz, Germany, have invented certain new and useful Improvements in Backing-Off Lathes, of which the following is a specification.

This invention relates to backing-off lathes, more especially to lathes for backing-off milling cutters, screw taps and other revolving tools. In lathes of this type a principal requirement is a mechanism causing the cutting tool to be rapidly withdrawn as soon as the actual cutting operation is completed, in order to obtain between the single teeth of the cutter grooves as narrow as possible. Assuming a definite pitch, cutter teeth will be obtained with a back face of considerable length, and the cutter itself will be of much greater duration. For rapidly withdrawing the tool from the revolving piece of work, a cam disc is arranged with its axis parallel to that of the work, a sliding-off cam cooperating with the cam disc. The tool is fixed in a carriage horizontally slidable or in an oscillatable saddle, and every time a tooth of the cam disc slides off the oscillating plate, the tool instantaneously jumps back from the work piece, which is revolving at a uniform speed. In the backing-off lathes hitherto known, this speed is in definite proportion to the width of the grooves in the milling cutter to be backed-off. Naturally, the width of the grooves will increase with higher speeds, for the reason that the tool requires a certain time for moving back from the work piece, the duration of the movement corresponding to its length, so that in all cases, where the distance is the same, the time also is the same. The tool must have returned to its initial position of rest, before it engages the next tooth of the work piece, and under no circumstances should the tool engage to cut the next tooth while the tool is yet vibrating in consequence of its movement, or before it has entirely completed its return movement. Assuming the length of a tooth of the work piece to be backed-off to be, for instance, 10 millimeters, the width of the groove 3 mm., and the time required for cutting the chip of each tooth 1 second, the work piece will turn during this second by one tooth and one groove and any definite point at its circumference will travel 13 mm. in 1 second. Of this path 3 mm., i. e. the width of the groove, and of the time 3/13 or 0.23 seconds, are reserved for the return movement of the tool. If, however, the output of the lathe is to be increased, i. e. if the work piece is to be finished in less time, its revolving speed must be increased, whereby, of course, the time for the return movement of the tool is reduced. The tool would have no time to return to its initial position and would cut away the front edge of the subsequent tooth. The only possibility of avoiding this drawback would reside in making the grooves of greater width. This would, however, entail a number of other serious drawbacks. The width of every single tooth of the milling cutter would be reduced and, as a consequence, the cutter would be capable of less work. Further, the widths of the grooves would differ from those accepted as standard widths and, consequently, the cutter would present an unnatural appearance. From this it must be concluded, that the number of revolutions of the work piece to be backed-off is definitely limited in the backing-off lathes hitherto known, and that this number cannot be exceeded, unless the drawbacks mentioned are acquiesced in. Therefore, the efficiency of the lathe is limited to a definite output. While the adjustment of the pitch according to different number of teeth has already been possible hitherto with a certain degree of accuracy, either by interchanging copying discs with different teeth or by interchanging the wheels of the change gear, the means for varying the backing-off depth of the single teeth have so far not attained to any degree of perfection. This holds good also for such backing-off devices, in which the tool has been fixed into the carriage in reversed order, and in which the work piece spindle is placed out of line with the driving spindle in an oscillating saddle, the latter being oscillated by means of a cam disc on the driving spindle. In this case, however, the piece of work is not tilted off suddenly.

In the backing-off lathe embodying the present invention, the work piece spindle is also journalled in an oscillating saddle, its rotary movement, however, is simultaneously transmitted to a cam disc cooperating with an oscillating plate having a curved portion at its circumference, which plate is adapted to be adjusted and fixed in position.
By adjusting this plate, the angle of the oscillation of the saddle as well as the backing-off depth may be varied. In order to make the number of teeth on the cam disc agree with the number of teeth on the piece of work, suitable gearing is thrown in or arranged. In this manner the necessity is obviated of keeping a large stock of cam discs for the varying requirements as regards the number of teeth and, before all, the various backing-off depths. An advantage, probably even more important, is the possibility of increasing the output. This is effected by placing the oscillatory axis of the oscillating saddle carrying the piece of work outside of the pitch circle of the driving wheel. In this manner a lead is produced during the running with cut, and during the return stroke a corresponding lagging results, which latter permits an increase of the speed of revolution.

In the drawings attached to this specification and forming part thereof, an embodiment of my invention is illustrated by way of example.

In the drawings—

Fig. 1 is a side elevation, partly in section and

Fig. 2 is a plan view, partly in section while

Fig. 3 discloses a detail, and

Fig. 4 represents the lead and lag diagrammatically.

Journalled in the lathe bed body $a$ is the driving spindle $b$ carrying the toothed wheel $c$. In addition, an oscillating saddle or frame $d$ is pivoted at the lathe bed in points at $e$, said points being positioned outside of the pitch-circle of the driving wheel $c$. This wheel meshes with a toothed wheel $f$ on a spindle $f'$ journalled in the oscillating saddle $d$. The toothed wheel $f$ is driving, by way of the wheel $g$, a gear wheel $h$, said gear wheel $h$ being also positioned in the oscillating saddle $d$ on a shaft $i$. To the latter the piece of work is fixed, for instance a milling cutter $k$.

The gear wheel $h$ actuates, by means of the gear wheel $l$, the shaft $m$ journalled in the oscillating saddle. Shaft $m$ carries a cam disc $n$ provided with 12 teeth, as shown in the modification illustrated in the drawing. This number of teeth corresponds to that of the teeth in the milling cutter $k$ to be worked. The cams $n'$ of the disc $n$ are in cooperative connection with an oscillating plate $o$ adapted to oscillate around the fulcrum pin $o'$, fixed to the lathe bed. The handle $o'$ serves to adjust the oscillating plate $o$. A scale arranged at the lathe bed, but not shown in the drawing, serves for determining the adjustment of plate $o$. The oscillating plate $o$ is provided with a curved section at its circumference, the curve being preferably the arc of a circle drawn from the center of the cam disc $n$. The oscillating saddle $d$ is at rest, if the curve of the oscillating plate is adjusted co-axial with the cam-disc. For the operation of backing-off the piece of work, the curve disc $o$ is adjusted according to the scale. In this manner the angle of oscillation of the, oscillating saddle and, consequently, the backing-off depth are pre-determined or adjusted, as the cams $n'$ are forcing back the oscillating saddle in accordance with the deflection imparted to them by the curve disc $o$. As soon as the cams $n'$ slide off the curve disc $o$, the oscillating saddle $d$ will instantaneously jump back by the same distance and will withdraw the milling cutter $k$ from the tool. The cam disc $n$ may be given any number of teeth. By interchanging the gear wheels $h$ and $l$ the number of teeth in the milling cutter $k$ are made to agree with the number of teeth in the cam disc $n$.

The leading movement is produced in this manner, that the oscillating saddle $d$, in its forward oscillation, is describing an arc of a circle around its center of oscillation at $e$, which is positioned outside of the pitch-circle of the driving wheel $c$, and in in this movement the oscillating saddle advances to meet the tool $p$ rigidly clamped to the carriage $q$, this advance taking place in the sense of rotation indicated by the angle $\alpha$ in Fig. 4. In this operation the driving wheel $c$ causes the toothed wheel $f$ to revolve in the same rotary sense. When the oscillating saddle $d$ is swinging back, and after the cam disc $n$ has slid off the curve disc $o$, a lagging movement will take place corresponding to the leading movement as to its extent.

Assuming that a milling cutter to be backed-off possesses 10 teeth and is revolving once within 10 seconds. The cutter will then revolve by one tooth and one groove within 1 second. The length of the tooth is 10 mm., the width of the groove 3 mm., consequently the distance or pitch of the teeth is 13 mm. The cutter, therefore, moves by the length of the tooth, i. e. by 10 mm. in 10/13=0.77 seconds. The remaining time of 0.23 seconds is taken up by the width of the groove and is, consequently, available for the return movement of the tool. Resulting from the facts, that the fulcrum point $e$ of the oscillating saddle $d$ is placed outside of the driving wheel $c$, and that the wheels $c$ and $f$ are meshing with each other, a lead of 3 mm. is obtained at each stroke, as has been ascertained by actual trials. The cutter is moving, within the time of 0.77 seconds, as calculated above, a total distance of 13 mm. The actual cutting work is done only during the distance of 10 mm., and, as a consequence of the lead, the cutter requires for this distance of 10 mm., instead of 0.77 seconds, only $$\frac{0.77 \cdot 10}{13} = 0.59 \text{ seconds.}$$

Hereby an excess of time, equalling $0.77-0.59=0.18$ seconds is available for the idle play of the tool as compared to the known backing-off lathes with a uniform rate of revolution. For the operation of withdrawing the milling cutter $k$ from the tool $p$, there remains a total of $0.23+0.18=0.41$ seconds. As, however, only 0.23 seconds are required for this return movement, the time of revolution may be reduced by 0.18 seconds for each groove, in other words, the speed of the revolving piece of work may be increased by that amount and, therefore, the output of the machine may be increased correspondingly.

If the operation of backing-off the milling-cutter $k$ in circumferential direction is to be combined with a lateral backing-off in an oblique direction, as has been already suggested in the case of backing-off devices with continuous drive, by means of oblique guiding slots, the oscillating movement of the saddle $d$ may be made use of in a very simple manner. For this purpose a tongue shaped element $s'$, illustrated in Fig. 3, is fixed to the oscillating saddle $d$. This tongue element is adjustable, and formed on it symmetrically are sliding-off edges or faces $s$ of any suitable shape. If the saddle $d$ is oscillating foward, one of the faces $s$ is pressing against a shiftable pin $r$ of the carriage $q$ and thereby produces a lateral displacement of the carriage $q$ simultaneous with the backing-off in the direction of the circumference of the milling cutter $k$. By throwing the shiftable pin $r$ to the right or to the left hand side, a right-or left hand side backing-off is obtained.

Having thus described my invention what I claim as new and desire to secure by Letters Patent of the United States is:

1. A backing-off lathe, comprising, in combination, a driving shaft, a driving wheel on said driving shaft, a saddle adapted to oscillate in regard to said driving shaft, a shaft journaled in said saddle, said shaft being in geared connection with said driving wheel a stud on the free end of said shaft, said stud being adapted to receive the cutter blank to be backed off, a tool carriage arranged opposite said shaft, a cam disc being in geared connection with said driving wheel, and a curve disc adapted to coact with said cam disc.

2. A backing-off lathe, comprising, in combination, a driving shaft, a driving wheel on said driving shaft, a saddle adapted to oscillate in regard to said driving shaft, a shaft journaled in said saddle, said shaft being in geared connection with said driving wheel, a stud on the free end of said shaft, said stud being adapted to receive the cutter blank to be backed off, a tool carriage, arranged opposite said shaft, a cam disc being in geared connection with said driving wheel, a curve disc adapted to coact with said cam disc, and means for adjusting said curve disc in order to vary the angle of oscillation of said saddle.

3. A backing-off lathe, comprising, in combination, a driving shaft, a driving wheel on said driving shaft, a saddle adapted to oscillate in regard to said driving shaft, a shaft journaled in said saddle, said shaft being in geared connection with said driving wheel, a stud on the free end of said shaft, said stud being adapted to receive the cutter blank to be backed off, a tool carriage, arranged opposite said shaft, a cam disc journaled in said saddle and being in geared connection with said driving wheel, a curve disc adapted to coact with said cam disc and means for adjusting said curve disc in order to vary the angle of oscillation of the saddle.

4. A backing-off lathe, comprising, in combination, a driving shaft, a driving wheel on said driving shaft, a saddle adapted to oscillate in regard to said driving shaft, a shaft journaled in said saddle, said shaft being in geared connection with said driving wheel, a stud on the free end of said shaft, said stud being adapted to receive the cutter blank to be backed off, a tool carriage, arranged opposite said shaft, a cam disc journaled in said saddle and being in geared connection with said driving wheel, a curve disc adapted to coact with said cam disc, means for adjusting said curve disc in order to vary the angle of oscillation of the said saddle, and a fulcrum pin disposed outside of the pitch-circle of said driving wheel, said saddle being adapted to oscillate around said pin.

5. A backing-off lathe, comprising, in combination, a driving shaft, a driving wheel on said driving shaft, a saddle adapted to oscillate in regard to said driving shaft, a shaft journaled in said saddle, said shaft being in geared connection with said driving wheel, a stud on the free end of said shaft, said stud being adapted to receive the cutter blank to be backed off, a tool carriage, arranged opposite said shaft, a cam disc journaled in said saddle and being in geared connection with said driving wheel, a curve disc adapted to coact with said cam disc, means for adjusting said curve disc in order to vary the angle of oscillation of said saddle, a fulcrum pin disposed outside of the pitch-circle of said wheel, said saddle being adapted to oscillate around said pin, and means for transmitting the rotation of the driving wheel to the shaft journaled in said saddle and to the said cam disc in order to produce an additional rotation of said driven shaft and a lead during the running with cut and a lag during the return movement.

6. A backing-off lathe, comprising, in combination, a shaft, a tool carriage, an oscillating saddle, and a cam disc adapted to rotate with said shaft, a curve disc, means for adjusting said curve disc, a driving wheel, a driven wheel, a stud on the free end of said shaft, said stud being adapted to receive the cutter blank to be backed off, a fulcrum pin, said saddle adapted to oscillate around said pin, said driving and driven wheels adapted to mesh one with the other and to produce an additional rotation of the driven wheel and a lead during the running with cut and a lag during the return movement, a symmetrically curved element, a shiftable pin adapted to cooperate with said element, said pin fixed adjustably to said tool carriage, said cooperation of said element and pin adapted to impart to said tool carriage, by the oscillation of said saddle and the action of said cam disc, a lateral movement for a lateral backing-off action simultaneous with the oblique movement for a backing-off action in the direction of the circumference.

In testimony whereof I affix my signature in presence of two witnesses.

JOSEF DICKESCHEID.

Witnesses:
  ROBERT SCHAEFFER,
  JACOB SCHNAPS.